United States Patent [19]

Ando

[11] 4,100,839
[45] Jul. 18, 1978

[54] VACUUM AUGMENTATION DEVICE
[75] Inventor: Hiromi Ando, Tokyo, Japan
[73] Assignee: Tokico Ltd., Kawasaki, Japan
[21] Appl. No.: 749,306
[22] Filed: Dec. 10, 1976
[30] Foreign Application Priority Data
Apr. 13, 1976 [JP] Japan ............................ 51-45740[U]
[51] Int. Cl.² .......................... F15B 9/10; F01B 19/00; F16J 3/02
[52] U.S. Cl. .................................. 91/369 B; 92/98 R
[58] Field of Search .............. 91/369 B, 369 A, 369 R

[56] References Cited
U.S. PATENT DOCUMENTS

| | | | |
|---|---|---|---|
| 2,949,892 | 8/1960 | Ayers, Jr. | 91/369 B |
| 3,389,642 | 6/1968 | Robinette | 91/369 B |
| 3,885,455 | 5/1975 | Kita | 91/369 B |
| 3,981,227 | 9/1976 | Azuma | 91/369 B |

Primary Examiner—Paul E. Maslousky
Attorney, Agent, or Firm—Schmidt, Johnson, Hovey & Williams

[57] ABSTRACT

A vacuum augmentation device having an outer shell divided into two chambers by means of a diaphragm, the diaphragm being adapted to be subjected to a differential pressure on the opposite sides thereof which is transferred through a piston plate on one face of a plurality of reaction levers to an output rod to produce a reaction force which is transferred to the other face of the reaction levers and then to an input rod and a metal mounting plate member interposed between the piston plate and reaction levers and having fulcrum pin retention pawls and fulcrum pin engaging pawls engaging the ends of fulcrum pins for preventing fulcrum pins from coming off the mounting plate member.

3 Claims, 3 Drawing Figures

VACUUM AUGMENTATION DEVICE

BACKGROUND OF THE INVENTION

This invention relates to an improved vacuum augmentation device for a vehicular brake device.

There has been proposed and practically employed a vacuum augmentation device of the type which has a diaphragm dividing an outer shell into two chambers and receiving a differential pressure on the opposite sides thereof which is transferred through a piston plate on one face of a plurality of reaction levers to an output rod to produce a reaction force which is transferred to the other face of the reaction levers and then to an input rod.

In the vacuum augmentation device of the type referred to hereinabove, in order to provide the fulcrums for the reaction levers, a metal mounting plate member interposed between the reaction levers and the piston plate has pins formed of hard wire retained thereon.

In the prior art vacuum augmentation device referred to hereinabove, one pin is associated with each of the reaction levers, and usually the number of pins employed is the same as the number of reaction levers; means for retaining the pins on the mounting metal plate member are provided by pawls formed by pressing and bending the mounting metal plate member at selected areas; and the fulcrum pins are retained between the pawls to position and hold the fulcrum pins for the reaction levers in position.

In the prior art vacuum augmentation device, taking possible error in the processing of parts and easiness of the assembly of parts into consideration, it is necessary to provide some radial clearance between the pin and the pin retention pawls. However, such clearance can not always assure firm retention of the pins and the pins may come off the mounting plate member in the assembly and/or use of the device. And since the pin can move within the clearance, the prior art vacuum augmentation device has the disadvantages that the vacuum augmentation ratio fluctuates from its original setting and that hysteresis increases. Furthermore, after prolonged use of the device, the mounting plate member is subjected to wear as the result of the displacement of the pins within the clearances.

SUMMARY OF THE INVENTION

Therefore, the present invention is to provide a vacuum augmentation device which can effectively eliminate the disadvantages inherent in the prior art vacuum augmentation device referred to hereinabove.

The above and other objects and attendant advantages of the present invention will be more readily apparent to those skilled in the art from a reading of the following detailed description in conjunction with the accompanying drawings which show one preferred embodiment of the present invention for illustration purpose only, but not for limiting the scope of the same in any way.

PREFERRED EMBODIMENT OF THE INVENTION

The present invention will be now described referring to the accompanying drawings which show one preferred embodiment of vacuum augmentation device of the invention for illustration.

Figure 1:
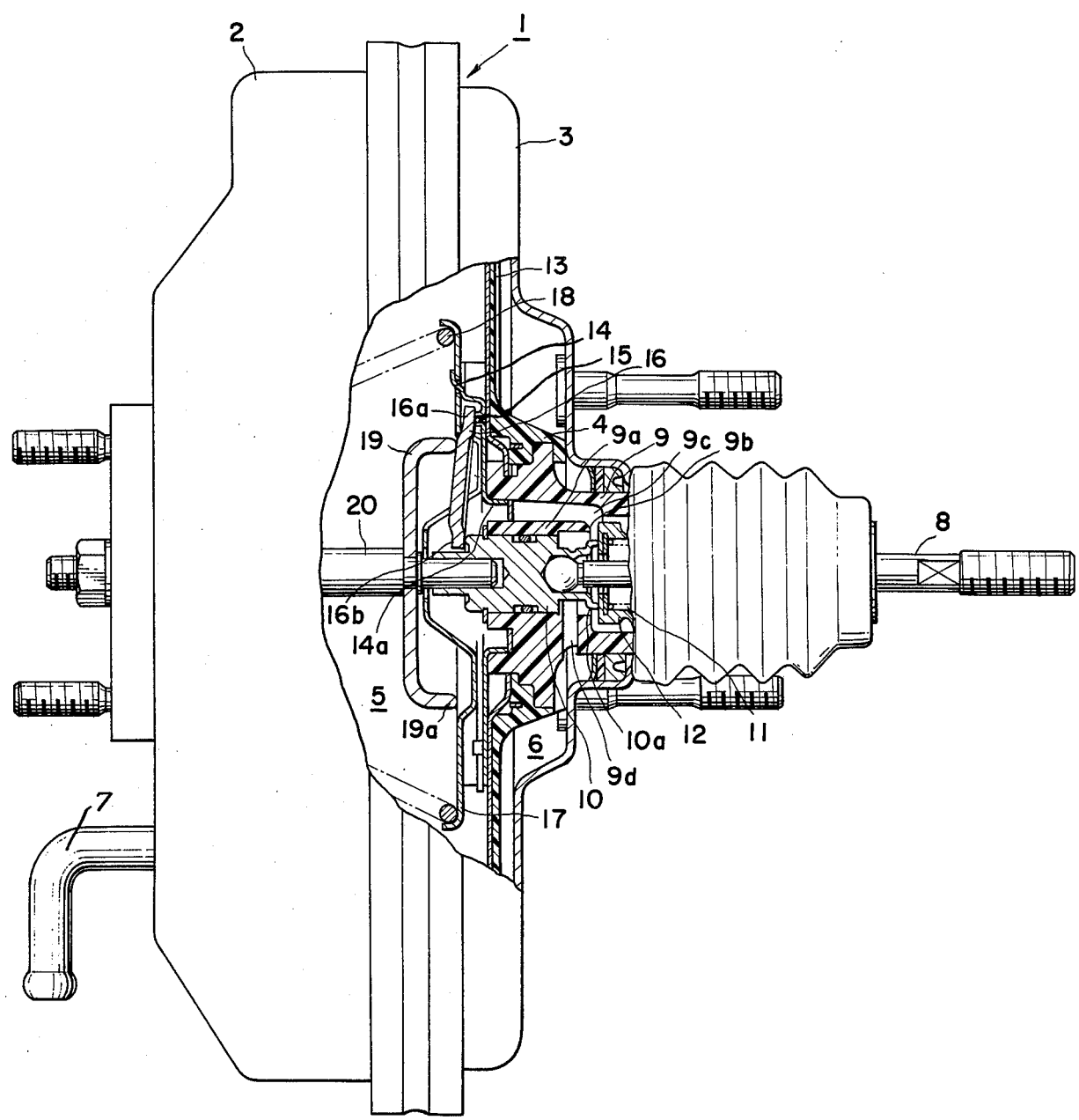
FIG. 1 is an elevational view of one preferred embodiment of vacuum augmentation device according to the present invention showing a portion thereof in section.

Reference numeral 1 in FIG. 1 denotes the shell body of the vacuum augmentation device and comprises a hollow cylindrical main body including a front shell portion 2 and a rear shell portion 3 which are connected together by any suitable conventional fastening means. An annular diaphragm 4 extends across the hollow interior of the rear shell portion 3 of the shell 1 and suitably secured to the inner wall of the shell portion 3 to divide the hollow interior of the shell 1 into a front chamber 5 and a rear chamber 6 in cooperation with a valve mechanism of which detailed description will be made hereinafter.

Provided in the shell 1 is a pipe 7 which is in communication at one end with the front chamber 5 and at the other end with the air suction system of an internal combustion engine (not shown).

In FIG. 1, reference numeral 8 denotes an input rod having the base end (the right-hand end as seen in FIG. 1) connected to a brake pedal (not shown) and the other or left-hand end connected to a plunger 10 fitted in the cylindrical portion 9a of a valve body 9 and is adapted to urge the plunger 10 leftwards as seen in FIG. 1 when the brake is applied.

The right-hand ends of the plunger 10 and the cylindrical portion 9a of the valve body 9 are provided with valve seats 10a, 9b, respectively and thus, as the plunger 10 moves within the shell 1 in one or the other direction, a poppet valve 12 which is loaded by a spring 11 abuts against or separates from the valve seats 10a, 9b.

When the brake is in its non-operative position, the poppet valve 12 is in abutment against the valve seat 10a and separated from the valve seat 9b to thereby maintain the front chamber 5 and rear chamber 6 in communication as shown in FIG. 1, but the communication between the two chambers 5, 6 and the atmosphere (the portion of the valve body 9 positioned rightwardly of the poppet valve 12 is in communication with the atmosphere) is interrupted.

The inner periphery of the annular diaphragm 4 and the inner periphery of an annular piston plate 13 which is provided along one or the left-hand side of the diaphragm 4 are fitted on the outer periphery of the valve body 9. Both the piston plate 13 and diaphragm 4 are adapted to receive a differential pressure. An annular metal mounting plate member 14 (shown in detail in FIG. 2) is positioned on the left-hand side of the piston plate 13 (as seen in FIG. 1) and fitted on the valve body 9 at the inner flange 14a of the plate member 14 which is first bent radially and rightwardly at an angle with respect to the plane of the plate member and then radially and inwardly in parallel to the plane of the plate member. The metal plate member 14 is provided with three equally and angularly spaced substantially rectangular projections 14b provided on the side of the plate member 14 opposite from the side where the flange 14a is provided and formed by pressing and the projections extend radially and inwardly some distance from the outer periphery of the metal plate member 14. A pair of substantially triangular projections 14c are formed by pressing on the side of the plate member 14 adjacent to and spaced from the opposite sides of the rectangular projections 14b where the rectangular projections 14b are formed. The triangular projections 14c extend radially and inwardly from the outer periphery of the plate member 14 by a distance greater than the rectangular projections 14b.

Two angularly spaced pin engaging pawls 14d are provided between the near one of the projections 14c associated with each of the adjacent projections 14b. The pawls 14d extend at an angle with respect to the plane of the plate member 14 in the opposite directions. The height of the pawls 14d from the plane of the plate member 14 is slightly greater than the diameter of a pin of which description will be made hereinbelow. The pawls 14d are each formed by stamping out the plate member 14 at selected areas and then bending the stamped out portions by a press, for example. Three pin retention pawls 14e, 14e, 14f are provided on the side of the plate member 14 where the pin engaging pawls 14d are provided inwardly of each of the rectangular projections 14b and between the associated pair of triangular projections 14c and arranged at the apices of a triangular arrangement. More particularly, the two pawls 14e are positioned at two spaced points in a straight line and the pawl 14f is positioned in another straight line parallel to and spaced from the first-mentioned straight line by a distance slightly greater than the diameter of the pin of which description will be made hereinbelow. The pawl 14f is positioned at the same distance from the pawls 14e. The pawls 14d serve to prevent the pins from coming off the mounting plate member 14 and the pawls 14e, 14f serve to hold the pins in position. The pawls 14e, 14f are also formed by stamping out the plate member at selected areas and then bending the stamped out portions substantially at right angles to the plane of the plate member.

Figure 3:
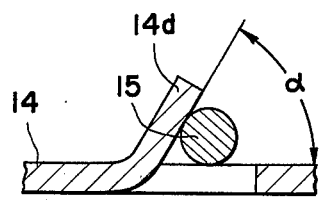
FIG. 3 is a cross-sectional view on an enlarged scale taken along substantially the line III—III of FIG. 2.

Since the pin engaging pawls 14d are provided to engage the pins, it is necessary that the pawls have such a configuration as to prevent the pins from coming off the plate member. For the purpose, as is more clearly shown in FIG. 3, the pawls are bent to an angle less than 90° with respect to the plane of the plate member and resiliently engage the pins.

Figure 2:
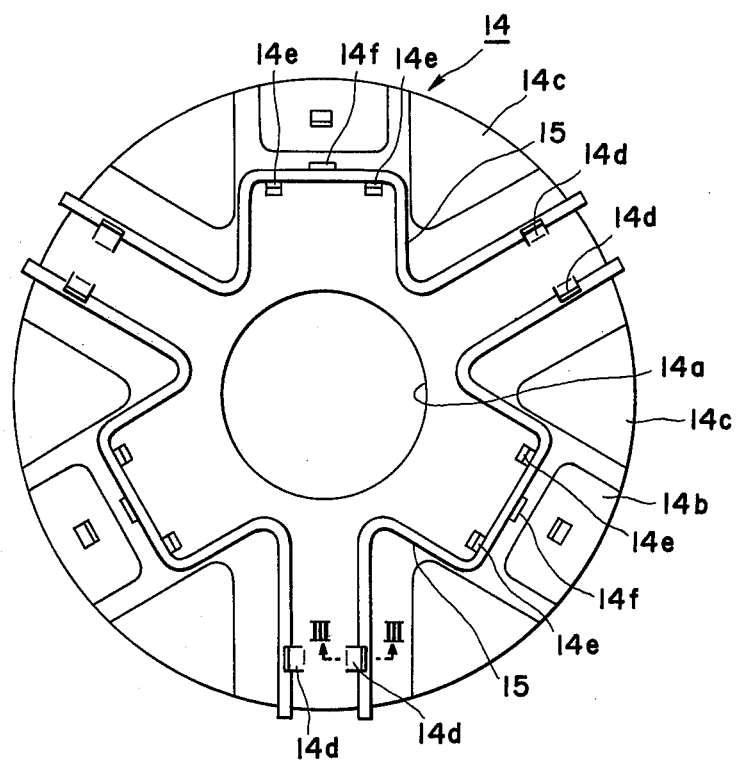
FIG. 2 is a plan view of the mounting plate member of the vacuum augmentation device of FIG. 1.

The pin 15 is formed into shaped configuration and in installing the pin on the plate member 14 a slight external force is imparted to the extreme ends of the legs of the pin 15 to bend them in the shape shown in FIG. 2 so they can resiliently engage the associated two pawls 14d. With such arrangement of the pins 15, the pins are held by their resiliency in the clearance defined between the mounting plate member 14 and pawls 14d so that the pins will not easily come off the mounting plate member. The center portion of each of the pins 15 is received between the pawls 14e, 14e on one hand and the pawl 14f on the other hand.

When the pins 15 are installed on the mounting plate member 14 in the manner as mentioned hereinabove, the pins 15 serve as the fulcrums for reaction levers 16 (see FIG. 1). The reaction levers 16 have a rectangular shape and a plurality of such levers are provided radially about the plunger 10 (three reaction levers in the illustrated embodiment) with the leading ends thereof engaging the center portions of the pins 15 and the base ends thereof held by the leading end of the plunger 10.

Reference numeral 17 denotes a cover plate and the cover plate has a dishlike cross-section as seen in FIG. 1. The cover plate 17 is normally urged rightward by means of a return spring 18 interposed between a portion adjacent the outer periphery of the cover plate 17 and the adjacent side of the front shell 2 to thereby impart a rightward force to the piston plate 13, diaphragm 4 and valve body 9.

Reference numeral 19 denotes a fulcrum plate having a U-shaped cross-section and abutting at the free ends 19a of the legs against the reaction levers 16 and reference numeral 20 denotes an output rod fitted at the inner end in the center portion of the fulcrum plate 19.

With the above construction and arrangement of the parts of the vacuum augmentation device of the invention, a thrust is imparted to the input rod 8 to it move leftwards a distance, and the plunger 10 and the poppet valve 12 loaded by the spring 11 are also moved leftwards within the stationary valve body 9. The input rod 8 moves until the poppet valve 12 abuts against the valve seat 9b on the valve body 9 to interrupt the communication between the front chamber 5 and the rear chamber 6.

As the input rod 8 is further pushed leftwards or advanced, the seating face on the poppet valve 12 separates from the valve seat 10a to allow air from the atmosphere to pass through the clearance left between the seating face on the poppet valve 12 and the valve seat 10a and through a passage 9d into the rear chamber 6. Entering into the rear chamber 6, the air produces a differential pressure between the opposite sides of the diaphragm 4 to initiate the vacuum augmentation operation. The additional brake force caused by the differential pressure is transferred through the piston plate 13, metal mounting plate member 14 and pins 15 held on the plate member 14 to the reaction levers 16 from one face of which the additional brake force is transferred through the fulcrum plate 19 to the output rod 20 to produce a reaction force. The thus produced reaction force is transferred through the plunger 10 at the ends 16b of the reaction levers 16 to the input rod 8.

When the leftward movement of the input rod 8 is stopped the valve body 9 returns to the initial position shown in FIG. 1 and the valve seat 10a on the plunger abuts against the poppet valve 12 whereby the moving parts cease their movement. Thereafter, when a leftward thrust is imparted to the input rod 8, the above-mentioned cycle of operation is repeated.

As is clear from the foregoing description of one preferred embodiment of the vacuum augmentation device, since the metal mounting plate is interposed between the piston plate and reaction levers, the pins mounted on the metal mounting plate member are prevented from coming off and the pins serve as fulcrums for the reaction levers, so the possibility of variation in position of the fulcrums for the reaction levers is eliminated and variation in vacuum augmentation characteristic and increase of hysteresis are reduced.

The pins can be positively mounted on the mounting plate member and the possibility of mis-mounting of the pins is reduced. Furthermore, the present invention has the advantages that the pins can be mounted on the mounting plate member without rattling and that the metal mounting plate member is subjected to relatively less wear in prolonged use.

While only one embodiment of the invention has been shown and described in detail, it will be understood that the same is for illustration purpose only and not to be taken as a definition of the invention, reference being had for the purpose to the appended claims.

What is claimed is:

1. A vacuum augmentation device having a diaphragm which divides a shell body into two chambers and, in one operating condition of the device, receives a differential pressure on the opposite sides of said diaphragm, said differential pressure being transferred to one face of a plurality of reaction levers through a piston plate and then to an output rod to produce a reaction force which is transferred back to the other face of said reaction levers and then to an input rod, characterized in that a metal mounting plate is interposed between said piston plate and said reaction levers, there is a pin for serving as a fulcrum for each of said reaction levers, and said metal mounting plate is provided with pin retention pawls oppositely juxtaposed with the sides of said pins to position the same with respect to said reaction levers and with pin engaging pawls for engaging end portions of said pins to prevent the pins from coming off said metal mounting plate member.

2. A vacuum augmentation device comprising an outer shell including front and rear shell portions connected together, a diaphragm extending across the interior of said outer shell, a valve mechanism provided within said outer shell to divide the interior of the outer shell into front and rear chambers, an input pedal connected at one end to a brake pedal and at the other end to a plunger connected to a valve body, a spring-loaded poppet valve for movement with said plunger and a piston plate provided along said diaphragm, characterized in that there is provided a plurality of fulcrum pins, an annular metal mounting plate member connected to said valve body, a plurality of equally and angularly spaced fulcrum pin retention means projecting from one side of said mounting plate member, and a plurality of equally and angularly spaced fulcrum pin engaging means projecting from said one side of the mounting plate member between each two adjacent pin retention means, each of said fulcrum pin retention means comprising three pawls positioned at the apices of an isosceles triangle with the first two of said pawls being positioned at the base portion of said triangle, said base portion making a right angle with the line of the radial direction of the metal mounting plate member, said fulcrum pin engaging means comprising a pair of spaced pawls positioned between two adjacent fulcrum pin retention means, said fulcrum pins being positioned and held on said mounting plate member by said pin retention means and said pin engaging means.

3. The vacuum augmentation device as set forth in claim 2, in which the height of said triangle is slightly greater than the diameter of said pins.

* * * * *